United States Patent
Tanimura et al.

(10) Patent No.: US 6,266,156 B1
(45) Date of Patent: Jul. 24, 2001

(54) AREA JUDGING APPARATUS

(75) Inventors: Mihoko Tanimura, Nara; Mitsuru Tokuyama, Soraku-gun; Masatsugu Nakamura, Kashiba; Masaaki Ohtsuki, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/136,226

(22) Filed: Aug. 19, 1998

(30) Foreign Application Priority Data

Aug. 21, 1997 (JP) .................................................... 9-225405

(51) Int. Cl.⁷ ............................. G06K 15/02; G06K 9/34; G06K 9/49; G06K 9/80; H04N 1/403
(52) U.S. Cl. ............................. 358/1.9; 358/462; 382/205; 382/271; 382/173
(58) Field of Search ..................................... 382/174, 173, 382/192, 194, 269, 272, 176, 271, 205; 358/462, 1.9, 466, 465, 456, 458

(56) References Cited

U.S. PATENT DOCUMENTS

| | | | |
|---|---|---|---|
| 4,501,016 | * 2/1985 | Persoon et al. | 382/272 |
| 4,996,603 | * 2/1991 | Kanemitsu et al. | 358/462 |
| 5,014,124 | 5/1991 | Fujisawa . | |
| 5,016,118 | 5/1991 | Nannichi | 358/462 |
| 5,317,419 | 5/1994 | Koizumi | 358/462 |
| 5,459,587 | 10/1995 | Fukushima | 358/462 |
| 5,696,841 | * 12/1997 | Nakatsuka | 382/174 |
| 5,701,364 | 12/1997 | Kanno | 382/176 |
| 5,920,655 | * 7/1999 | Makita et al. | 382/272 |
| 5,956,156 | * 9/1999 | Fukushima | 358/447 |

FOREIGN PATENT DOCUMENTS

| | | |
|---|---|---|
| 0 415 648 A2 | 3/1991 | (EP) . |
| 5 28944 | 7/1987 | (JP) . |
| 2-162477 | 6/1990 | (JP) . |
| 07262374 | 10/1995 | (JP) . |

* cited by examiner

*Primary Examiner*—Scott Rogers
(74) *Attorney, Agent, or Firm*—Dike Bronstein, Roberts & Cushman IP Group; David G. Conlin; David A. Tucker

(57) ABSTRACT

The read out image data is stored in the mask memory in a predetermined mask unit, and binarized into binary value with a predetermined threshold in the binarizing circuit. The binarized image data is output to the main scanning direction-black pixel counting circuit and the sub scanning direction-black pixel counting circuit, respectively, to count black pixels in the main scanning direction and in the sub scanning direction, respectively. The largest value is determined by the comparator, and designated as the linkage degree. With the judging circuit, the area judgement of the character area, the photograph area and the dot area is performed based on the linkage degree.

8 Claims, 15 Drawing Sheets

Busyness

AREA JUDGING APPARATUS

BACKGROUND OF THE INVENTION (1) Field of the Invention

The present invention relates to an area judging apparatus for judging multiple areas of character portions, photograph portions, halftone dot portions and the like of the image in digital copying machines, digital printers, digital facsimile machines or the like.

(2) Description of the Prior Art

It is necessary to perform the optimum processing according to the properties of the original document image in order to realize the high quality of the recorded image. For that purpose, in the case of an original document in which character portions, photograph portions and halftone dot portions coexist together, area judgement is performed. In such case, the accuracy of the judgement becomes an important problem.

As a method for judging the halftone (dot) photograph and the character area, there is proposed a method in which after performing a processing for emphasizing the coefficient of a high frequency domain by the filtering processing, and binarizing into binary value, judgement is performed depending upon the presence or absence of closed areas of white or black in a predetermined area (see Japanese Patent Publication Hei 5 No. 28944).

In the above Japanese Patent Publication Hei 5 No. 28944, however, only a judgement if it is a halftone (dot) photograph area or a character area is performed for a predetermined area unit (for example, minimum 3 pixels×3 pixels). Therefore, fine judgement of multiple areas such as a character area, a photograph area, or a halftone dot area cannot be performed.

SUMMARY OF THE INVENTION

It is therefore the object of the present invention to provide an area judging apparatus which does not require the pre-processing such as filtering or the like, and which can perform the judgement in one pixel unit, and set three areas of character area, photograph area and halftone (dot) area, or an intermediate area among them, thereby finer judgement becomes possible.

Another object of the present invention is to provide an area judging apparatus in which when a plurality of characteristic parameters is adopted, the judgement accuracy is further improved, and by controlling the judgement rule according to conditions, a judgement result can be obtained with higher accuracy.

With a view of attaining the above objects, the gist of the present invention is as follows.

The first gist of the present invention is an area judging apparatus for judging multiple areas including character portions, photograph portions and dot portions, comprising:

binarizing means which designates a block of a predetermined number of pixels centering around target pixels among the image data as a mask, and compares the pixels in the mask with a threshold to binarize it into binary value;

linkage degree-calculating means for calculating the linkage degree indicating the linking condition of black pixels, based on the number of black pixels for each line in each direction in the binarizing mask; and area judging means for designating the linkage degree as a characteristic value, and judging an area of the target pixels based on the characteristic value.

The second gist of the present invention is an area judging apparatus for judging multiple areas including character portions, photograph portions and dot portions, comprising:

binarizing means which designates a block of a predetermined number of pixels centering around target pixels among the image data as a mask, and compares the pixels in the mask with a threshold to binarize it into binary values;

linkage degree-calculating means for calculating the linkage degree indicating the linking condition of black pixels, based on the number of black pixels for each line in each direction in the binarizing mask;

density parameter-calculating means for calculating the density parameter from the density of the black pixels in the binarizing mask; and area judging means for designating the linkage degree and the density parameter as the characteristic value, and judging an area of the target pixels based on the characteristic value.

The third gist of the present invention is an area judging apparatus according to the gist 2, wherein the density parameter-calculating means designates (maximum value—minimum value) of the density of pixels in the mask as the density parameter.

The 4th gist of the present invention is an area judging apparatus according to the gist 2, wherein the density parameter-calculating means calculates the sum total of the difference in the density of successive 2 pixels, with respect to the main scanning direction and in the sub scanning direction in the mask, respectively, and designates the smaller one as the density parameter.

The 5th gist of the present invention is an area judging apparatus according to the gist 2, wherein the density parameter-calculating means calculates (maximum value—minimum value) of the density of pixels in the mask, and the sum total of the difference in the density of successive 2 pixels, with respect to the main scanning direction and the sub scanning direction in the mask, respectively, and designates the smaller one as the density parameter.

The 6th gist of the present invention is an area judging apparatus according to the gist 1, wherein the threshold is the mean value of the density of pixels in the mask.

The 7th gist of the present invention is an area judging apparatus according to the gist 2, wherein the threshold is the mean value of the density of pixels in the mask.

The 8th gist of the present invention is an area judging apparatus according to the gist 1, wherein the threshold is a value which is varied so that there is a difference between the linkage degree for each area, with respect to the mean value of the density of pixels in the mask.

The 9th gist of the present invention is an area judging apparatus according to the gist 2, wherein the threshold is a value which is varied so that there is a difference between the linkage degree for each area, with respect to the mean value of the density of pixels in the mask.

The 10th gist of the present invention is an area judging apparatus according to the gist 1, wherein the linkage degree-calculating means counts the number of black pixels in each line both in the main scanning direction and in the sub scanning direction from the results of binarization in the mask, and designates the largest value among them as the linkage degree.

The 11th gist of the present invention is an area judging apparatus according to the gist 2, wherein the linkage degree-calculating means counts the number of black pixels in each line both in the main scanning direction and in the sub scanning direction from the results of binarization in the mask, and designates the largest value among them as the linkage degree.

The 12th gist of the present invention is an area judging apparatus according to the gist 1, wherein the linkage degree-calculating means counts the number of successive black pixels in each line both in the main scanning direction and in the sub scanning direction from the results of binarization in the mask, and designates the largest value among them as the linkage degree.

The 13th gist of the present invention is an area judging apparatus according to the gist 2, wherein the linkage degree-calculating means counts the number of successive black pixels in each line both in the main scanning direction and in the sub scanning direction from the results of binarization in the mask, and designates the largest value among them as the linkage degree.

The 14th gist of the present invention is an area judging apparatus according to the gist 1, wherein the linkage degree-calculating means counts the number of successive black pixels in each line both in the main scanning direction and in the sub scanning direction from the results of binarization in the mask, adds the results for successive plural lines, and designates the largest value among them as the linkage degree.

The 15th gist of the present invention is an area judging apparatus according to the gist 2, wherein the linkage degree-calculating means counts the number of successive black pixels in each line both in the main scanning direction and in the sub scanning direction from the results of binarization in the mask, adds the results for successive plural lines, and designates the largest value among them as the linkage degree.

The 16th gist of the present invention is an area judging apparatus according to the gist 1, wherein the linkage degree-calculating means counts the number of successive black pixels in each line in the main scanning direction, in the sub scanning direction, and in two diagonal directions at 45° from the results of binarization in the mask, adds the results for successive plural lines, and designates the largest value among them as the linkage degree.

The 17th gist of the present invention is an area judging apparatus according to the gist 2, wherein the linkage degree-calculating means counts the number of successive black pixels in each line in the main scanning direction, in the sub scanning direction, and in two diagonal directions at 45° from the results of binarization in the mask, adds the results for successive plural lines, and designates the largest value among them as the linkage degree.

The 18th gist of the present invention is an area judging apparatus according to the gist 16 and 17, wherein when the number of the successive black pixels in each line is counted in the main scanning direction, in the sub scanning direction, and in two diagonal directions at 45°, normalization is performed according to the difference in the total pixel number to be counted in each direction.

The 19th gist of the present invention is an area judging apparatus according to the gist 1, wherein the linkage degree-calculating means counts the number of successive black pixels in each line both in the main scanning direction and in the sub scanning direction from the results of binarization in the mask, adds the results for successive plural lines, and further determines (maximum value minimum value) of the added results in the main scanning direction and in the sub scanning direction, respectively, and designates the largest value as the linkage degree.

The 20th gist of the present invention is an area judging apparatus according to the gist 2, wherein the linkage degree-calculating means counts the number of successive black pixels in each line both in the main scanning direction and in the sub scanning direction from the results of binarization in the mask, adds the results for successive plural lines, and further determines (maximum value minimum value) of the added results in the main scanning direction and in the sub scanning direction, respectively, and designates the largest value as the linkage degree.

The 21st gist of the present invention is an area judging apparatus according to the gist 1, wherein when the number of pixels in the mask differs in the main scanning direction and in the sub scanning direction, the characteristic value is normalized.

The 22nd gist of the present invention is an area judging apparatus according to the gist 2, wherein when the number of pixels in the mask differs in the main scanning direction and in the sub scanning direction, the characteristic value is normalized.

The 23rd gist of the present invention is an area judging apparatus according to the gist 1, wherein when conforming to the predetermined conditions, the judgement according to the characteristic value can be corrected and controlled.

The 24th gist of the present invention is an area judging apparatus according to the gist 2, wherein when conforming to the predetermined conditions, the judgement according to the characteristic value can be corrected and controlled.

DESCRIPTION OF THE PREFERRED EMBODIMENTS

The embodiments of the present invention will now be described with reference to the accompanying drawings.

Figure 1:
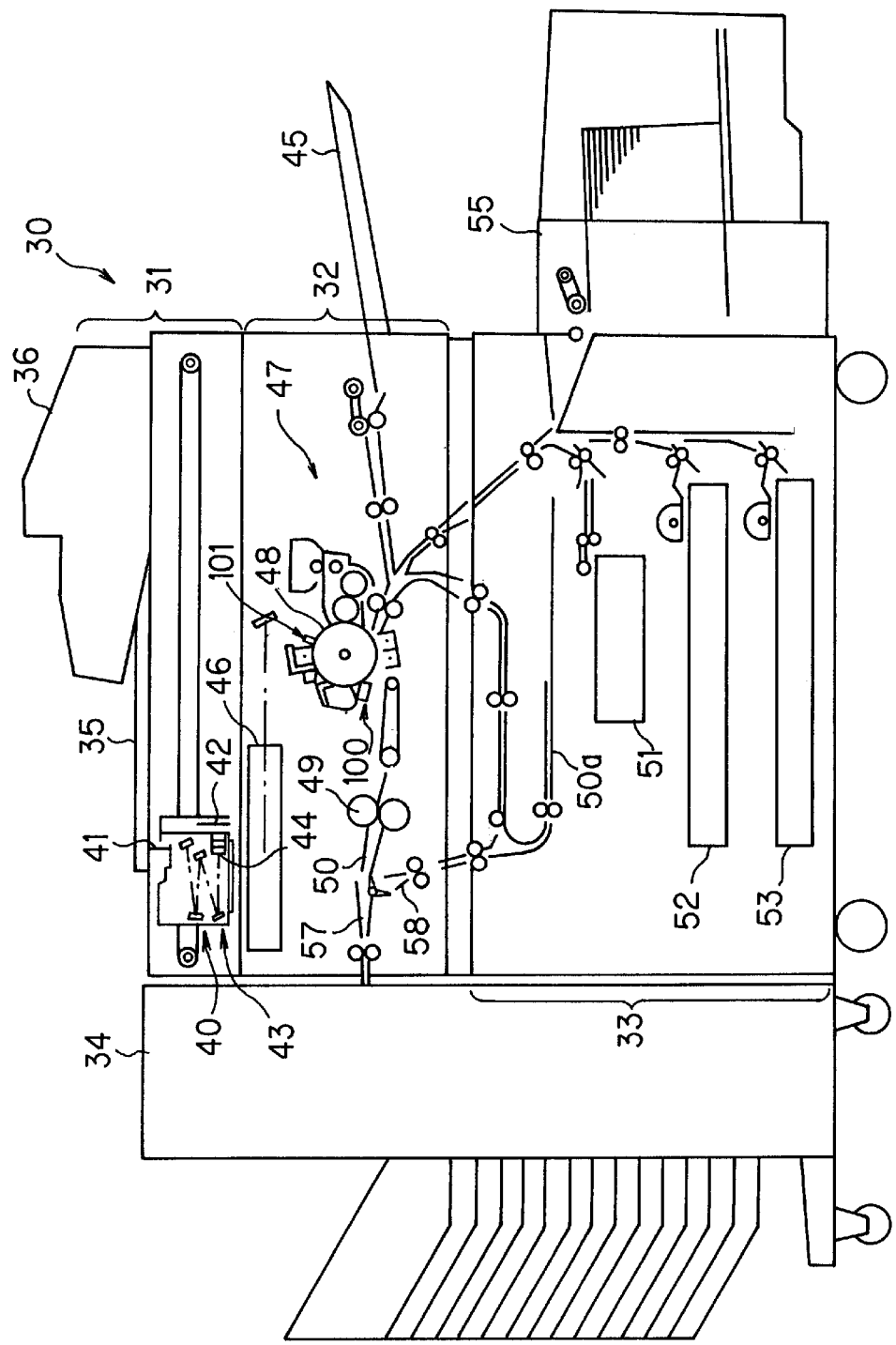
FIG. 1 is a structural diagram showing a digital copying machine which adopts the inversion development according to the present invention.

FIG. 1 is a structural diagram showing a digital copying machine which adopts the inversion development according to the present invention. This digital copying machine 30 is provided with a scanner section 31, a laser printer section 32, a multi-stage paper feeding unit 33 and a sorter 34.

The scanner section 31 comprises an original document table 35 comprising a transparent glass, an automatic document transfer device (RDF) 36 corresponding to both faces, and a scanner unit 40. The multi-stage paper feeding unit 33 has a first cassette 51, a second cassette 52, a third cassette 53 and a fourth cassette which may be added as required.

In the multi-stage paper feeding unit 33, a sheet of paper is fed one by one from sheets of papers housed in a cassette in each stage, and transferred to the laser printer section 32. The RDF 36 is so constituted that plural sheets of original documents are set at a time, one sheet of original document is automatically fed to the scanner unit 40, and one side or both sides of the original document is/are read by the scanner unit 40 according to the selection by the operator.

The scanner unit 40 includes a lamp reflector assembly 41 for exposing the original document, a plurality of reflection mirrors 43 for guiding the optical image reflected from the original document to a photoelectric transformation element (CCD) 42, and a lens 44 for imaging the reflected optical image from the original document on the CCD 42. The scanner 31 is so constituted that the scanner unit 40 reads the original image while moving along the lower face of the original document table 35, and when the RDF 36 is used, it reads the original image while transferring the original document in a state that the scanner unit 40 is stopped at a predetermined position below the RDF 36. The image data obtained by reading the original image with the scanner unit 40 is transferred to the image processing section which is not shown, and after each processing is performed, the image data is temporarily stored in the memory in the image processing section, and the image data in the memory is provided to the laser printer section 32 in response to the output instruction to form an image on a sheet of paper.

The laser printer section 32 comprises tray 45 for manual inserting, a laser write unit 46 and an electrophotographic processing section 47 for forming an image. The laser write unit 46 has a semiconductor laser for outputting the laser beam according to the image data from the above-mentioned memory, a polygon mirror for isometrically deflecting the speed of the laser beam, and a f-θ lens for correcting so that the isometrically speed-deflected laser beam is isometrically speed-deflected on a photosensitive drum 48 in the electrophotographic processing section 47. The electrophotographic processing section 47 is provided with an electric charger, a developing device, a transfer device, a peeling device, a cleaning device, a discharging device and fixing device 49 around the photosensitive drum 48. With respect to the sheet of paper on which the image is fixed by the fixing device 49, a transfer path 50 is provided in the downstream of the transfer direction, and the transfer path 50 branches into a carrier path 57 leading to the sorter 34 and a carrier path 58 leading to the multi-stage paper feeding unit 33.

According to the above construction, in the laser write unit 46 and the electrophotographic processing section 47, the laser write unit 46 operates the laser beam for scanning, thereby the image data read out from the above-mentioned memory is formed on the surface of the photosensitive drum 48 as the electrostatic latent image, and the toner image which is visualized by the toner is electrostatically transferred onto the paper which is carried from the multi-stage paper feeding unit 33 or from the tray 45 for manual inserting and fixed thereon. The paper on which the image is formed as described above is sent out from the fixing device 49 via the carrier paths 50 and 57 to the sorter 34, or via the carrier paths 50 and 58 to the inverse carrier path 50a.

The above-mentioned digital copying machine is provided with an area judging section which judges in which area the image data read out by the CCD 42 is. This area judging section performs the area judgement of character areas, photograph areas and dot areas.

(First Embodiment)

Figure 2:
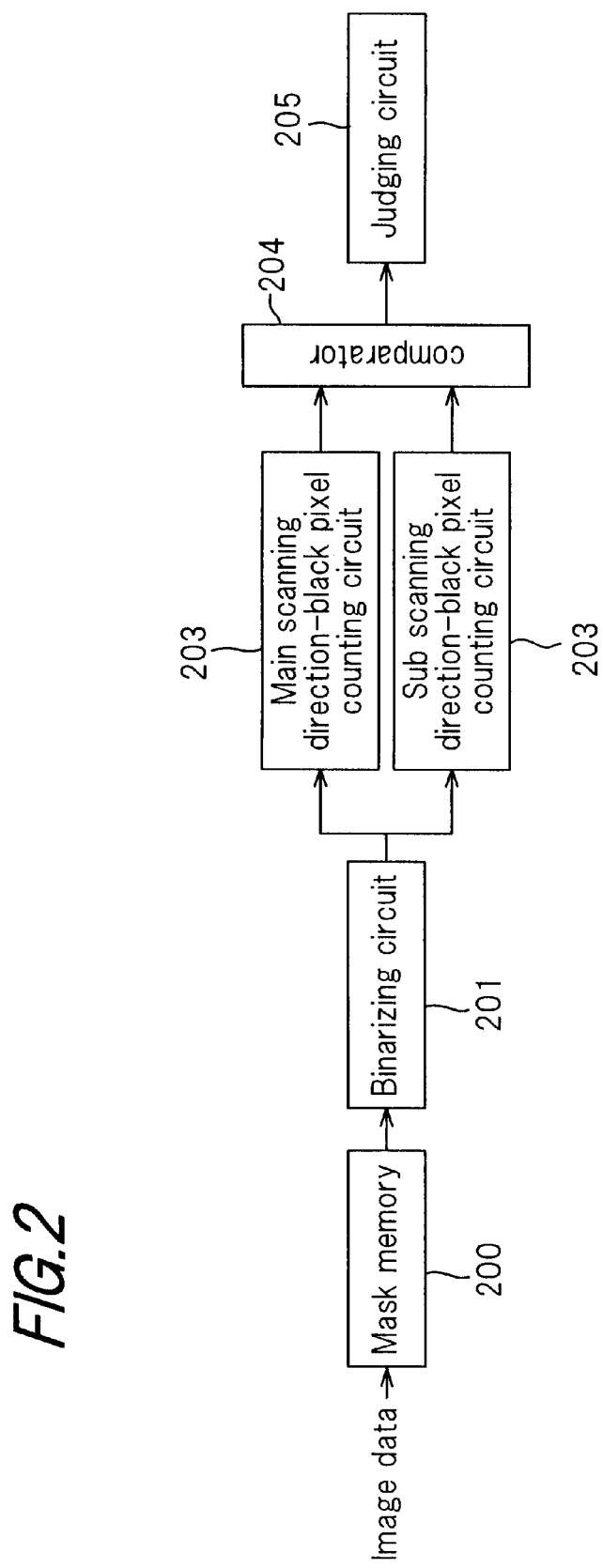
FIG. 2 is a block diagram of the area judging section according to the first embodiment.

FIG. 2 is a block diagram of the area judging section according to the first embodiment. The area judging section comprises a mask memory 200, a binarizing circuit 201, a main scanning direction-black pixel counting circuit 202, a sub scanning direction-black pixel counting circuit 203, a comparator 204, and a judging circuit 205.

This area judging section performs the area judgement as described below. That is, the image data (8 bit, 256 gradations) read out by the CCD 42 is stored in the mask memory 200 in a predetermined mask unit, and binarized into binary value by a predetermined threshold in the binarizing circuit 201. The binarized image data is output to the main scanning direction-black pixel counting circuit 202 and the sub scanning direction-black pixel counting circuit 203, respectively, and the black pixels are counted in the main scanning direction and the sub scanning direction, respectively. The comparator 204 determines the largest value among them, and designates it as the linkage degree. Thus, the main scanning direction-black pixel counting circuit 202, the sub scanning direction-black pixel counting circuit 203 and the comparator 204 operate as the linkage degree calculating means. In the judging circuit 205, the area judgement of the character area, photograph area and dot area is performed according to the linkage degree. That is to say, respective characteristics that in the character area, there are lots of linkage of lines (i.e., the linkage degree is high), that in the dot area, the linkage of the same length continues (i.e., the linkage degree is not so high), and that in the photograph area, a large change is not seen in the density (i.e., the linkage degree is low) are extracted according to the parameter of the linkage degree, and compared with a predetermined value, thereby the judgement of the area becomes possible.

Figure 3:
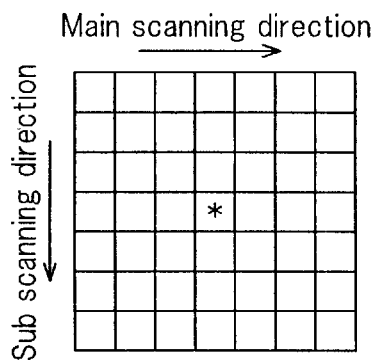
FIG. 3 is a view explaining the mask which is stored in the mask memory.

Here, the mask unit of the image data stored in the mask memory 200 is, as shown in FIG. 3, composed of 7×7 pixels centering around the target pixel. In the figure, * mark shows the target pixel, and the area judgement of the target pixel is performed based on the information of nearby pixels.

Then, in the binarizing circuit 201, if the threshold for binarization is fixed, all the low density portion of the character becomes white pixels, and cannot be detected as the linked pixel. Moreover, all the photograph portion having a high density which should not be detected as the linked pixel become the black pixels, thus the judgement becomes difficult. Therefore, the binarization threshold is changed for each mask, as the mean value of the density of pixels in the mask. Hence, the above-mentioned problem can be avoided.

However, with only this processing, the judgement in the high density area becomes rather difficult, and separation of the medium to high density portions of the dots having a high number of lines and the character portion becomes difficult. As a measure therefor, a threshold for the binarization is varied for each mask, as a value suitable for the character extraction, based on the mean value of the density of pixels in the mask. While the influence on the linkage degree in the low density portion is suppressed, the threshold for the binarization is increased so that the linkage degree in the intended medium to high density portions can be lowered. For example, the mean value of the density of pixels in the mask is multiplied by a predetermined value (a number larger than 1). By not adding but multiplying, the threshold for the binarization can be further increased as the mean density in the mask becomes high, hence the effect increases.

The method for calculating the linkage degree will now be described.

First Method For Calculating the Linkage Degree

Figure 4A:
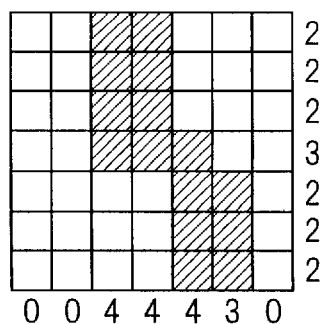
FIGS. 4A–4D are views explaining the first linkage degree calculating method.

In the first method for calculating the linkage degree, the black pixels in each line in the main scanning direction and the sub scanning direction are counted from the binarized results, to determine the largest value among them, and the largest value is designated as the linkage degree. For example, as shown in FIG. 4A, the largest value of the number of the black pixels in the main scanning direction and the sub scanning direction is 4, thus the linkage degree becomes 4. Thereby, the detection of lines in the vertical direction and the horizontal direction becomes possible.

By comparing this value of the linkage degree with a predetermined value, the area judgement is performed. Predetermined values A, B and C are set in three areas, or more finely, and the area judgement is performed respectively with respect to multiple areas including the medium area, as follows:

Linkage degree<A: Photograph area

A≦Linkage degree<B: Dot area

B≦Linkage degree: Character area.

Second Method For Calculating the Linkage Degree

Figure 4B:
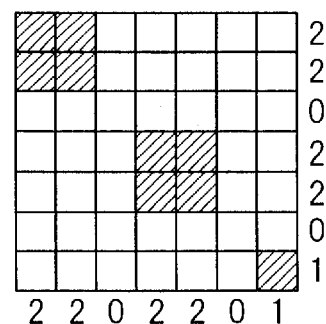
Figure 4C:
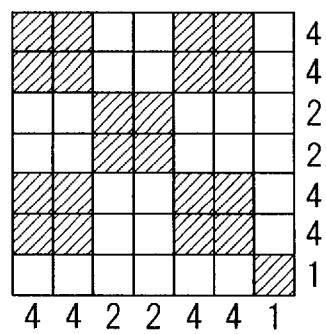
Figure 4D:
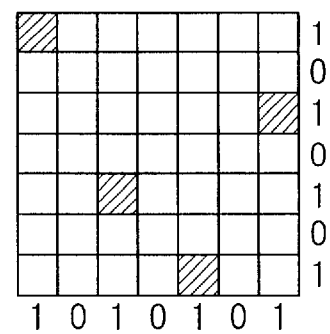
Figure 5A:
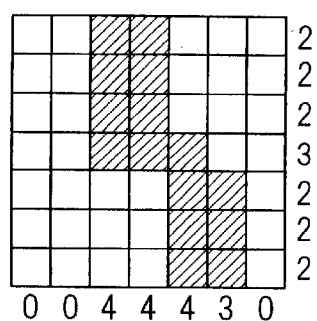
FIGS. 5A–5D are views explaining the second linkage degree calculating method.
Figure 5B:
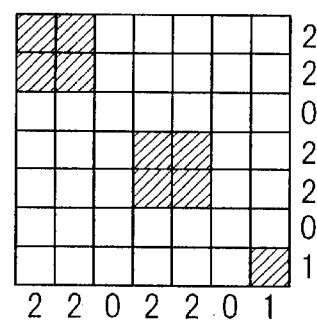
Figure 5C:
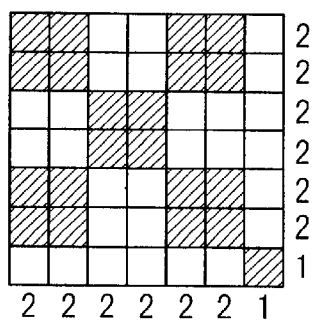
Figure 5D:
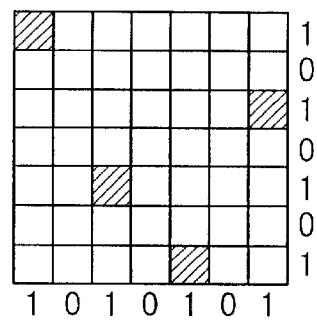
Figure 6A:
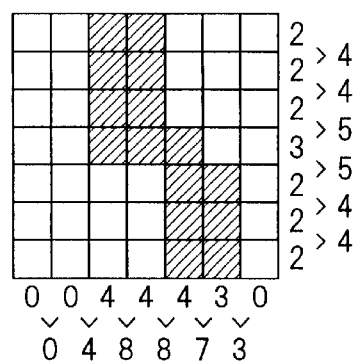
FIGS. 6A–6D are views explaining the third linkage degree calculating method.
Figure 6B:
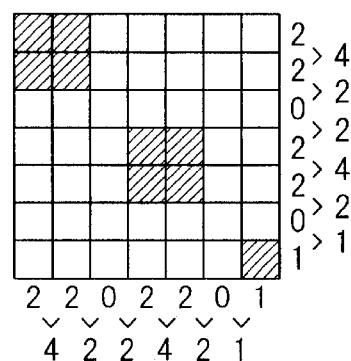
Figure 6C:
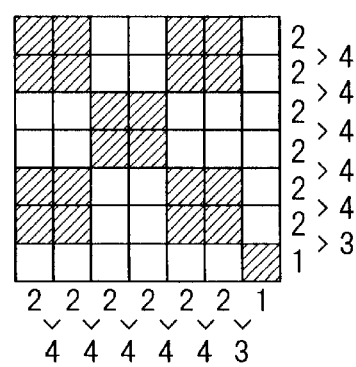
Figure 6D:
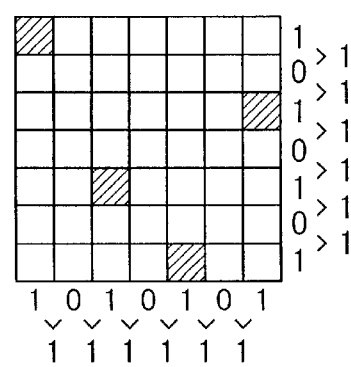

With this calculation method of the linkage degree, however, a portion where judgement is difficult may be present. In FIG. 4A, the linkage degree is 4, and in FIG. 4B where it is an example of halftone dots, the linkage degree becomes 2. The separation of characters and halftone dots as in FIG. 4A and FIG. 4B is possible, but in FIG. 4C where it is also an example of halftone dots, the linkage degree becomes 4, thus discrimination from FIG. 4A is not possible. Therefore, the judgement becomes difficult (FIG. 4D is an example of a photograph, and the linkage degree is 1).

Therefore, as the second method for calculating the linkage degree, successive black pixels in each line are counted in the main scanning direction and the sub scanning direction from the binarized results. Thereby, the detection of segments only linking in the vertical direction and the horizontal direction becomes possible. With this method, calculation is performed with respect to the data of FIGS. 4A–D, which are shown in FIG. 5A, FIG. 5B, FIG. 5C, and FIG. 5D, respectively. The linkage degrees are 4, 2, 2, 1, respectively, hence the area judgement becomes possible.

Third Method For Calculating the Linkage Degree

With the second calculation method of the linkage degree, for example, in the case of the mask size of 7×7 pixels, there are only 8 stages of from 0 to 7. It is difficult to judge the multiple areas of three areas of character area, the dot area, and the photograph area, or including the medium area within this range. Therefore, as the third calculation method of the linkage degree, successive black pixels in each line are counted in the main scanning direction and the sub scanning direction from the binarized results, and the sum of the counting results of successive plural lines is calculated. This is designated as the linkage degree, thereby, the range extends to several times, and the judgement becomes easy. For example, when the sum of the counting results of adjoining two lines is designated as the linkage degree, the range becomes 15 stages of from 0 to 14. With this method, calculation is performed with respect to the data of FIGS. 4A–D, which are shown in FIG. 6A, FIG. 6B, FIG. 6C, and FIG. 6D, respectively. The linkage degrees are 8, 4, 4, 1, respectively, hence the area becomes more easily to be separated.

Fourth Method For Calculating the Linkage Degree

Figure 7A:
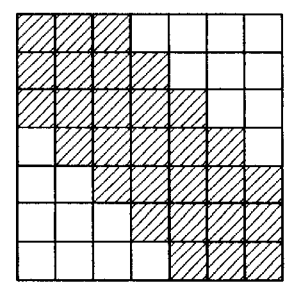
FIGS. 7A and 7B are views explaining the mask indicating the successive black pixels in each line in the diagonal direction at 45°.
Figure 7B:
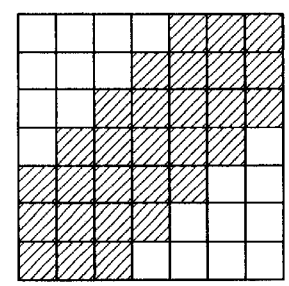
Figure 8:
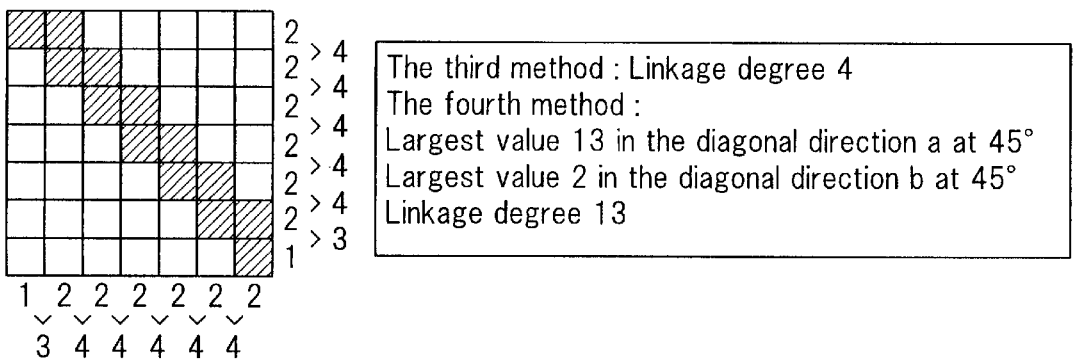
FIG. 8 is a view explaining the fourth linkage degree calculating method.

As the fourth method for calculating the linkage degree, in order to improve the judgement accuracy with respect to the character area, successive black pixels in each line are counted not only in the main scanning direction and the sub scanning direction but also in the two diagonal directions at 45° from the binarized results, and the sum of the counting results of successive plural lines is calculated. Thereby, the segment linking not only the vertical direction and the horizontal direction, but also in the diagonal direction can be detected, thus the accuracy in separation of oblique portions of characters is improved. As shown in FIG. 7A and 7B, counting of successive black pixels in each line in the two diagonal directions at 45° is also performed, and the largest value in the counting results in the main scanning direction, in the sub scanning direction, and in the two diagonal directions is designated as the linkage degree. Because of the relation of the pixel number, only 5 lines in the middle shown by the netting are counted. An example where successive plural lines are two lin es is shown in FIG. 8. Hence, the linkage degree of a diagonal line at 45° as shown in FIG. 8 is 4 with the third calculation method of the linkage degree, but with the fourth calculation method of the linkage degree, the linkage degree in the diagonal direction becomes 13, hence the judgement accuracy of the oblique portion of the character is improved.

Fifth Method For Calculating the Linkage Degree

As the fifth method for calculating the linkage degree, when the linkage degree in the main scanning direction, in the sub scanning direction, and in the two diagonal directions at 45° is calculated from the binarized results, normalization is performed according to the total number of pixels to be counted for each line. In the case of a square mask of 7×7 pixels, the number of pixels in one line is 7 in the main scanning direction and in the sub scanning direction. But in the two diagonal directions at 45°, there are 7 pixels only in the center line, and in other lines 6 pixels and 5 pixels, respectively. In order to alleviate this difference by approximation, after the normalization is performed, the sum of the counting results of successive plural lines is calculated with respect to the results of lines having different number of pixels. Thereby, the more accurate detection of segments in the diagonal direction becomes possible.

Sixth Method For Calculating the Linkage Degree

Figure 9A:
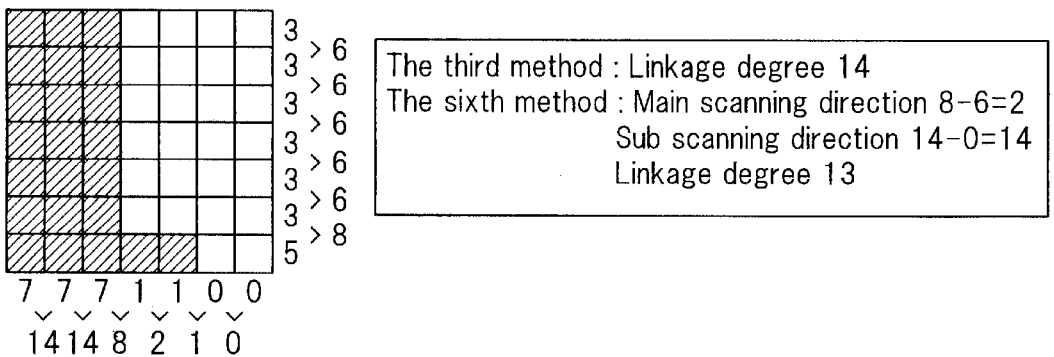
FIG. 9A and 9B are views explaining the sixth linkage degree calculating method.
Figure 9B:
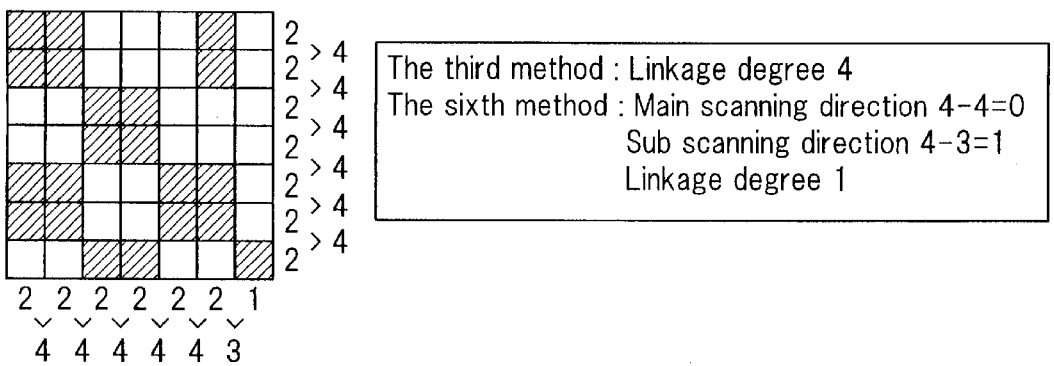

Furthermore, as the sixth method for calculating the linkage degree, in order to improve the judgement accuracy, count successive black pixels in each line are counted in the main scanning direction and in the sub scanning direction from the binarized results, calculate the sum of the results of counting successive plural lines, and determine (maximum value−minimum value) of the added results in the main scanning direction and in the sub scanning direction, respectively, and designate the larger one as the linkage degree. With this method, the linkage degree of successive images in lines of the same length such as a halftone dot image can be reduced by performing the subtraction of (maximum value−minimum value) of the added results. Thereby, the judgement becomes easier, and the accuracy is improved. An example in which successive plural lines are two lines is shown in FIGS. 9A and B. FIG. 9A shows a part of a character, and the linkage degree with the third method or with the fifth method is 14. With respect to the dot in FIG. 9B, the linkage degree with the third method is 4, but with the sixth method, the linkage degree becomes 1, whereby the judgement becomes easier.

Figure 10:
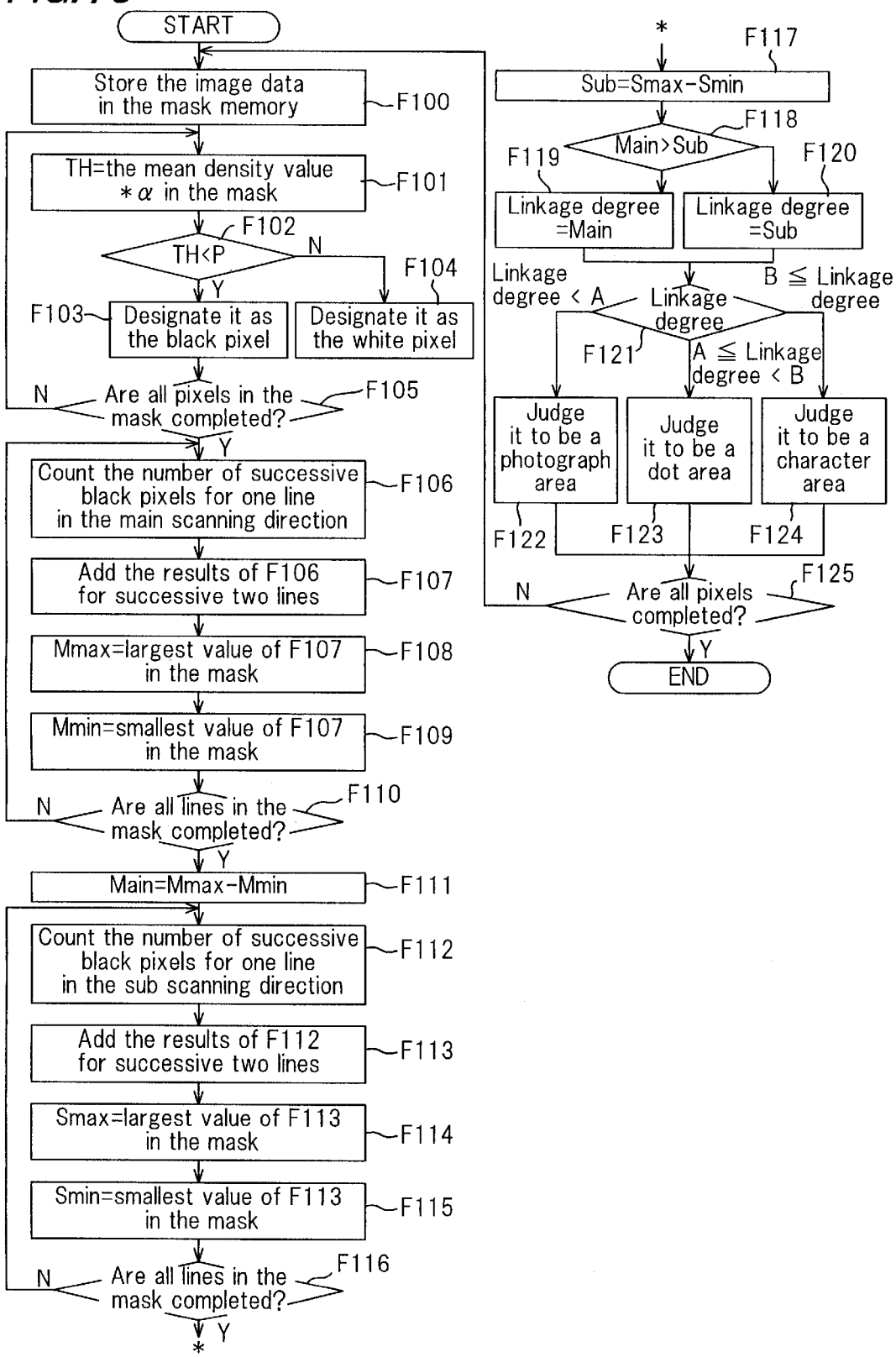
FIG. 10 is a flow chart showing the processing flow of the sixth linkage degree calculating method.

FIG. 10 is a flow chart showing the processing flow of the sixth linkage degree calculating method.

First, the image data (8 bit), the peripheral pixels around the target pixels are stored in the mask memory (F100). Then, the mean value of pixels in the mask is calculated, multiplied by a predetermined number a, and designated as the threshold TH (F101). By comparing the density P of the pixels to be processed and TH (F102), the pixels are binarized into binary value of black pixels (F101) and white pixels (F104). After subjecting all pixels in the mask to this processing (F105), the number of successive black pixels is counted for one line in the main scanning direction (F106), and the sum of results of counting successive two lines is calculated (F107). The results are compared sequentially, to store the largest one in the mask as Mmax (F108), and the smallest one as Mmin (F109). This processing is performed with respect to all lines in the main scanning direction (F110), and designate Mmax-Mmin as Main (F111).

In the same manner, the number of successive black pixels is counted for one line in the sub scanning direction (F112), and the sum of results of counting successive two lines is calculated (F113). The results are compared sequentially, to store the largest one in the mask as Smax (F114), and the smallest one as Smin (F115). This processing is performed with respect to all lines in the sub scanning directions (F116), and Smax-Smin is designated as Sub (F117). Then, Main and Sub are compared (F118), and the larger one is designated as the linkage degree (F119, F120).

Subsequently, the linkage degree is compared with the predetermined numbers A and B (F121), and judgement in which area of photograph area (F122), the dot area (F123) and the character area (F124) the target pixels belong, is made according to the results. This judgement may be performed by providing the set value finely, not limiting the set value to the above three areas, to divide pixels into multiple areas including the medium area. This processing is performed with respect to all pixels of the image data (F125).

(Second Embodiment)

In this embodiment, the area judgement is performed by combining the parameter of linkage degree and the other parameter. In the two-dimensional plane in which the two characteristic values of the linkage degree parameter and the other parameter are designated as the axes, the area judgement is performed by applying a predetermined boundary. Since the area judgement is performed from the results of two parameters, erroneous judgement is reduced to improve the accuracy in the judgement, and according to the setting of the boundary in the two-dimensional plane, finer judgement becomes possible with higher accuracy.

First, designate (maximum value−minimum value) of the density of pixels in the mask as the second parameter (hereinafter referred to as the "maximum density difference").

Figure 11:
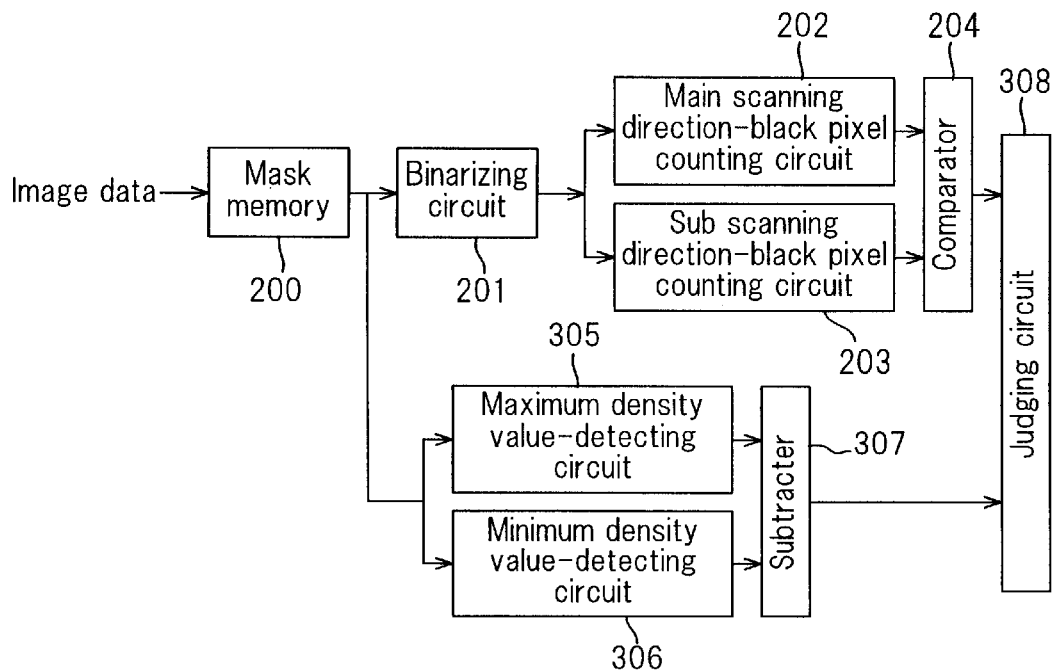
FIG. 11 is a block diagram of the area judging section of the second embodiment.

FIG. 11 is a block diagram of the area judging section of the second embodiment. This area judging section comprises a maximum density value-detecting circuit 305, a minimum density value-detecting circuit 306, a subtracter 307 and a judging circuit 308, in addition to the above-mentioned mask memory 200, binarizing circuit 201, main scanning direction-black pixel counting circuit 202, sub scanning direction-black pixel counting circuit 203 and comparator 204.

As described above, the image data (8 bit, 256 gradations) read by the CCD 42 is stored in the mask memory 200 in a predetermined mask unit, and binarized into binary value by a predetermined threshold in the binarizing circuit 201, and black pixels are counted with respect to the main scanning direction and the sub scanning direction by the main scanning direction-black pixel counting circuit 202 and the sub scanning direction-black pixel counting circuit 203, to determine the maximum value among them with the comparator 204. This becomes the linkage degree. Furthermore, determine the maximum value and the minimum value of the density value of pixels in the mask with the maximum density value-detecting circuit 305 and the minimum density value-detecting circuit 306, to determine the (maximum value−minimum value) with the subtracter 307. Based on the linkage degree thus calculated and the value of (maximum value−minimum value), judge the area with the judging circuit 308.

Figure 12:
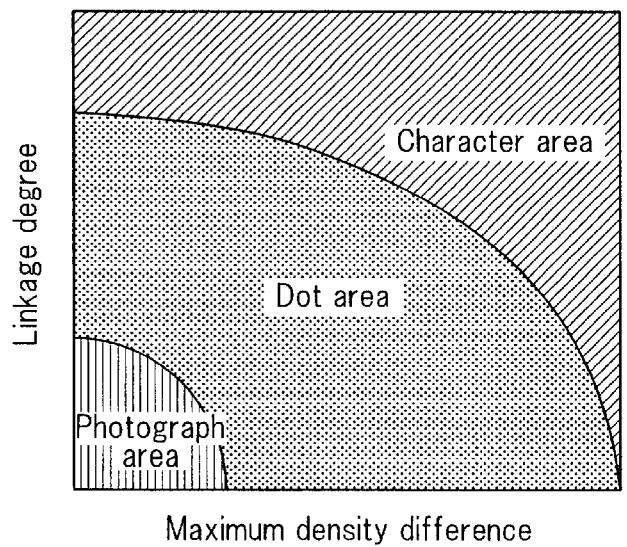
FIG. 12 is a view explaining the boundary in the area judgement set on the two-dimensional plane which designates the linkage degree and the maximum density difference as the parameter.

The boundary in the two-dimensional plane is set by the LUT (Look Up Table) as in FIG. 12, to divide pixels into the character area, the photograph area and the dot area. This judgement may be performed by providing the set value finely, not limiting the set value to the above three areas, to divide pixels into multiple areas including the medium area.

(Third Embodiment)

In this embodiment, the sum total of the difference in the density value of successive two pixels in the mask is calculated in the main scanning direction and in the sub scanning direction, respectively, as the second parameter, and the smaller one is used (hereinafter referred to as the "busyness").

Figure 13:
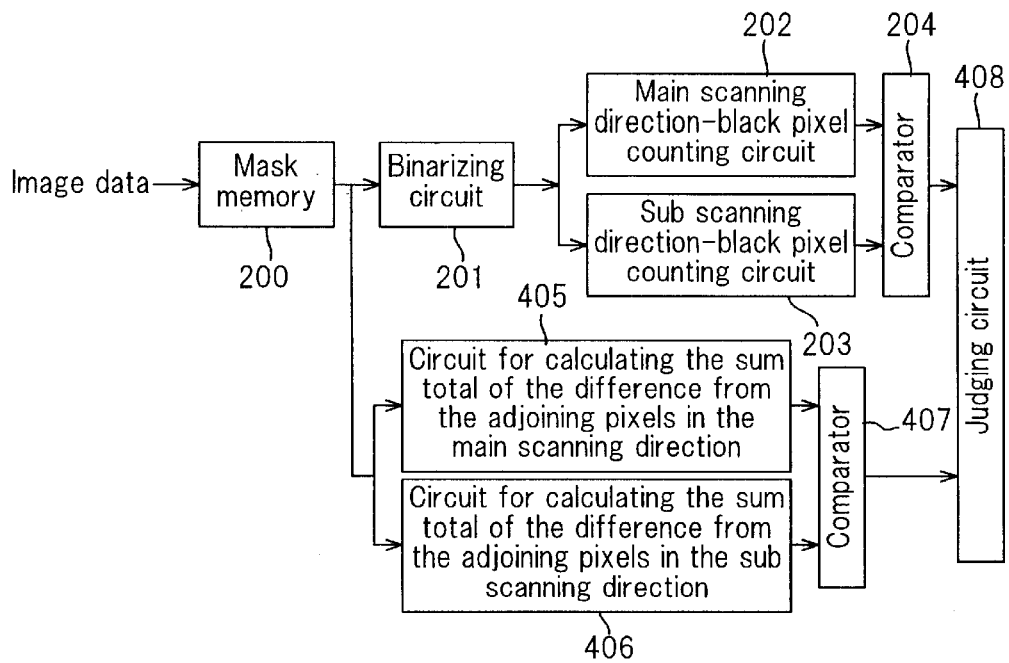
FIG. 13 is a block diagram of the area judging section of the third embodiment.

FIG. 13 is a block diagram of the area judging section of the third embodiment. This area judging section comprises a circuit 405 for calculating the sum total of the difference from the adjoining pixels in the main scanning direction, a circuit 406 for calculating the sum total of the difference from the adjoining pixels in the sub scanning direction, a comparator 407 and a judging circuit 408, in addition to the above-mentioned mask memory 200, binarizing circuit 201, main scanning direction-black pixel counting circuit 202, sub scanning direction-black pixel counting circuit 203 and comparator 204.

The linkage degree is calculated in the same manner as described above, therefore the description thereof is omitted. The sum total of the difference in the density value of successive two pixels in the mask in the main scanning direction is calculated by the circuit 405 for calculating the sum total of the difference from the adjoining pixels in the main scanning direction, and the sum total of the difference in the density value of successive two pixels in the mask in the sub scanning direction is calculated by the circuit 406 for calculating the sum total of the difference from the adjoining pixels in the sub scanning direction. Then the smaller one is determined by the comparator 407. The area judgement is performed by the judging circuit 408, using the value of the linkage degree and the busyness thus calculated.

Figure 14:
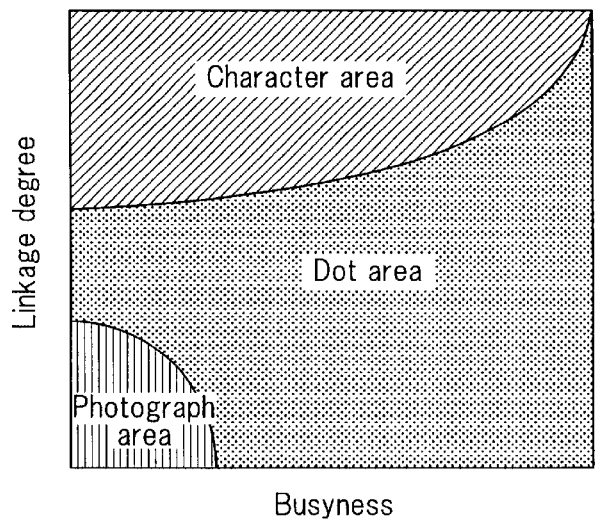
FIG. 14 is a view explaining the boundary in the area judgement set on the two-dimensional plane which designates the linkage degree and the busyness as the parameter.

The boundary in the two-dimensional plane is set by the LUT as shown in FIG. 14, to divide pixels into the character area, the photograph area and the dot area. This judgement may be performed by providing the set value finely, not limiting the set value to the above three areas, to divide pixels into multiple areas including the medium area.

(Fourth Embodiment)

In this embodiment, the area judgement is performed by combining the parameter of linkage degree and other two parameters. In the three-dimensional plane in which the three characteristic values of the linkage degree parameter and the other two parameters are designated as the axes, the area judgement is performed by applying a predetermined boundary. Since the area judgement is performed from the results of three parameters, erroneous judgement is reduced to improve the accuracy in the judgement. According to the setting of the boundary plane on the three-dimensional plane, finer judgement becomes possible with higher accuracy.

The other two characteristic values are (maximum value−minimum value) of the density of pixels in the mask (i.e., the maximum density difference), and the busyness which is obtained by calculating the sum total of the density value difference of two successive pixels in the mask, in the main scanning direction and in the sub scanning direction, respectively, and designating the smaller one as the busyness, and the area judgement is performed using these two characteristic values. That is to say, the area judgement is performed comprehensively, including all constituents in the above-mentioned embodiments.

Figure 15:
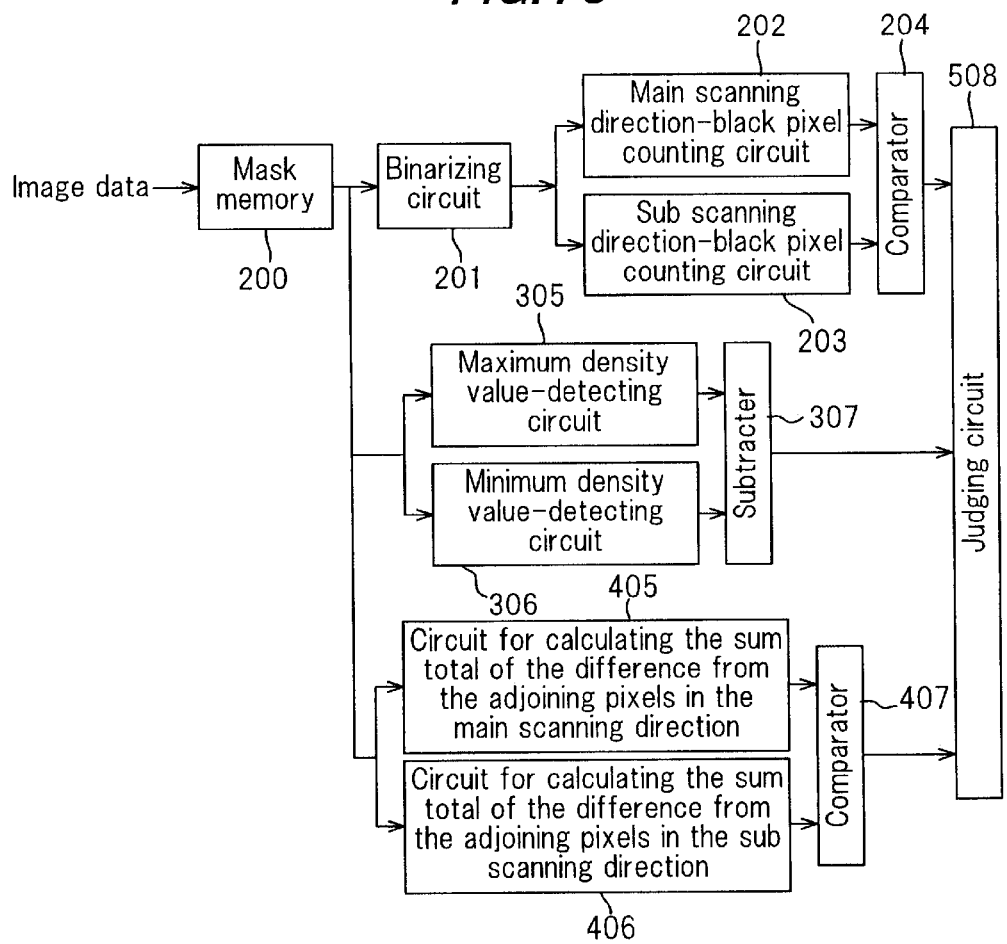
FIG. 15 is a block diagram of the area judging section of the fourth embodiment.

FIG. 15 is a block diagram of the area judging section of the fourth embodiment. This area judging section comprises a judging circuit 508 in addition to the above-mentioned mask memory 200, binarizing circuit 201, main scanning direction-black pixel counting circuit 202, sub scanning direction-black pixel counting circuit 203, comparator 204, the maximum density value-detecting circuit 305, the minimum density value-detecting circuit 306, the subtracter 307, the circuit 405 for calculating the sum total of the difference from the adjoining pixels in the main scanning direction, the circuit 406 for calculating the sum total of the difference from the adjoining pixels in the sub scanning direction, and the comparator 407.

The image data (8 bit, 256 gradations) read by the CCD 42 is stored in the mask memory 200 in a predetermined mask unit, and binarized into binary value by a predetermined threshold in the binarizing circuit 201, and the linkage degree is calculated with respect to the main scanning direction and the sub scanning direction by the main scanning direction-black pixel counting circuit 202 and the sub scanning direction-black pixel counting circuit 203, to determine the largest value among them with the comparator 204. This becomes the linkage degree.

Furthermore, the maximum value (305) and the minimum value (306) of the density value of pixels in the mask are determined with the maximum density value-detecting circuit 305 and the minimum density value-detecting circuit 306, to determine the maximum density difference (maximum value minimum value) with the subtracter 307.

Furthermore, the sum total of the difference in the density value of successive two pixels in the mask in the main scanning direction in the mask is calculated with the circuit 405 for calculating the sum total of the difference from the adjoining pixels in the main scanning direction, and the sum total of the difference in the density value of successive two pixels in the mask in the sub scanning direction is calculated with the circuit 406 for calculating the sum total of the difference from the adjoining pixels in the sub scanning direction. Then the smaller one (busyness) is determined by the comparator 407.

Based on the linkage degree, the maximum density difference and the busyness value thus calculated, the area judgement is performed (508).

Figure 16:
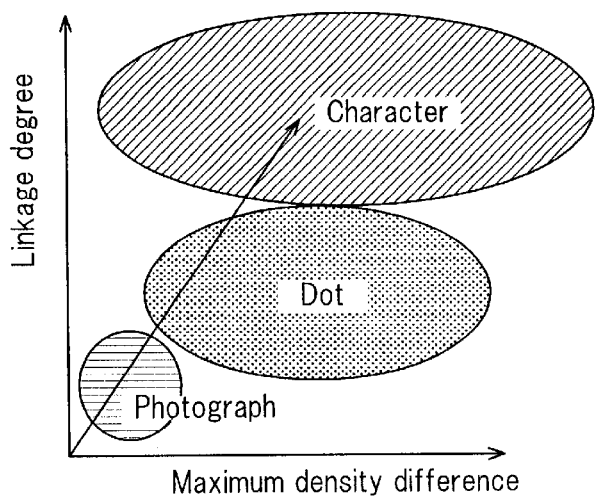
FIG. 16 is a view explaining the boundary in the area judgement set on the three-dimensional plane which designates the linkage degree, the maximum density difference and the busyness as the parameter.
Figure 17:
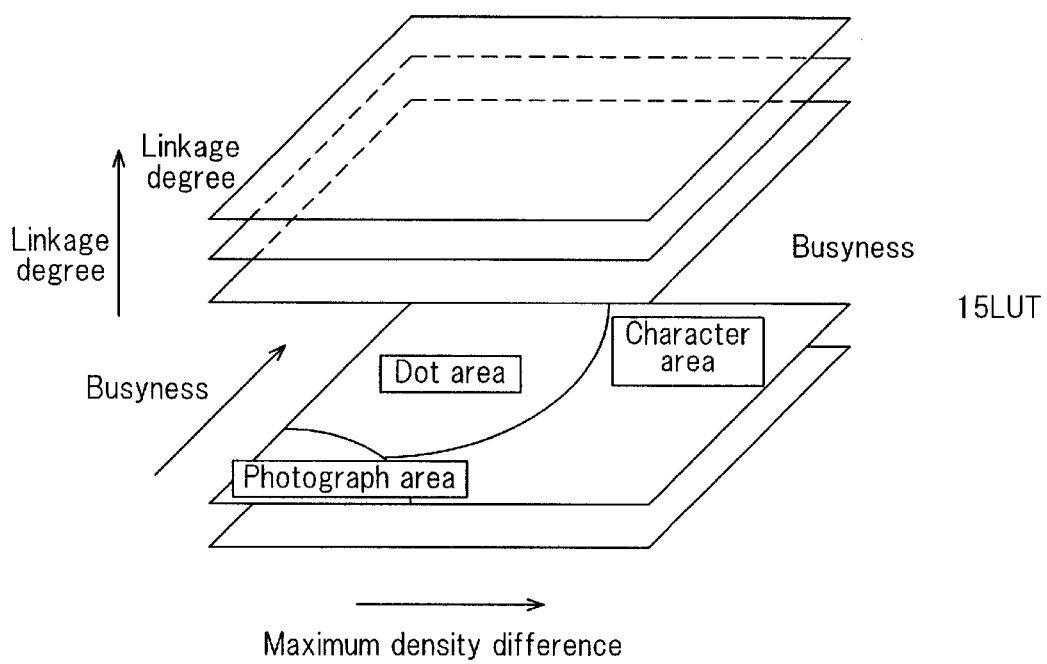
FIG. 17 is a view explaining the boundary in the area judgement in which the two-dimensional plane designating the maximum density difference and the busyness as the parameter is developed on the three-dimensional plane designating the linkage degree as an axis.

The boundary in the three-dimensional space is set as shown in FIG. 16, to divide pixels into the character area, the photograph area and the dot area. This judgement may be performed by providing the set value finely, not limiting the set value to the above three areas, to divide pixels into multiple areas including the medium area. This is developed into the two-dimensional planes as shown in FIG. 17 to prepare the LUT. As an example, when the linkage degree of the mask size of 7×7 pixels is adopted, the range of the linkage degree is 15 stages of from 0 to 14. Each of them is developed to the two-dimensional plane in which the two characteristic values of the maximum density difference and the busyness are designated as the axes, to set predetermined boundaries with the LUT. That is, 15 LUTs are prepared. The judgement may be performed by providing the set value finely, not limiting the set value to the above three areas, to divide pixels into multiple areas including the medium area.

Figure 18:
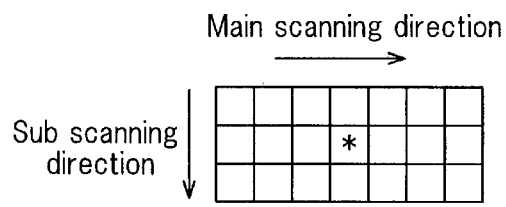
FIG. 18 is a view explaining the mask for normalization.

Moreover, when the mask size is different in the main scanning direction and in the sub scanning direction (when it is not a square mask), the normalization is performed in the process for calculating the parameter. With respect to the linkage degree and the busyness, counting of pixels or calculation of the pixel density is performed in the main scanning direction and in the sub scanning direction, therefore this processing is performed. Thereby, it becomes possible to alleviate approximately the difference in the calculation results due to the different number of pixels. As shown in FIG. 18, it is assumed that the mask is 6×3 pixels, 6 pixels in the main scanning direction and 3 pixels in the sub scanning direction. In this case, the calculation results in the sub scanning direction is multiplied by 3/7 to normalize it.

(Fifth Embodiment)

With this embodiment, if the predetermined conditions are satisfied, the judgement of the judging circuit can be corrected and controlled. Thereby, the processing of correction of the judgement or the like can be applied only to a desired pixel or parameter, thereby the judgement accuracy is further improved.

For example, the control of the area judgement by the judging circuit 508 in the area judging section shown in FIG. 15 will be described. This control is performed for the correction of the linkage degree or the other two characteristic values (maximum density difference, busyness), using the mean density value of pixels in the mask or a value based on this (the threshold of binarization) as the predetermined conditions for the judgement control. Thereby, for example, it becomes possible to prevent a case where the high density portion of the photographic image close to 255 in the 8-bit density value (i.e., the photographic image portion having a solid black for the most part) is erroneously judged as the character area or the dot area.

Figure 19A:
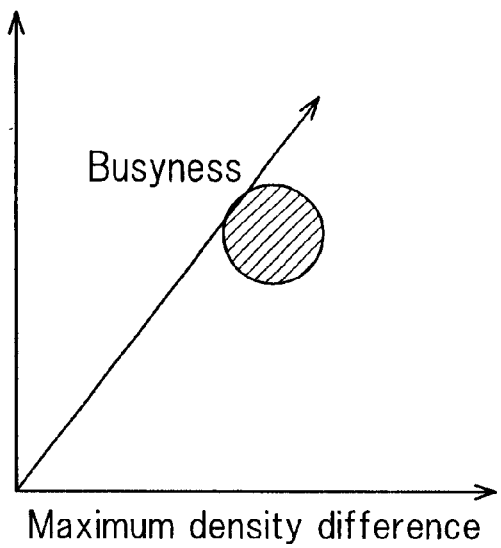
FIGS. 19A and 19B are views explaining the distribution state of the photograph image which is almost solid black in the three-dimensional space, and the correction thereof.
Figure 19B:
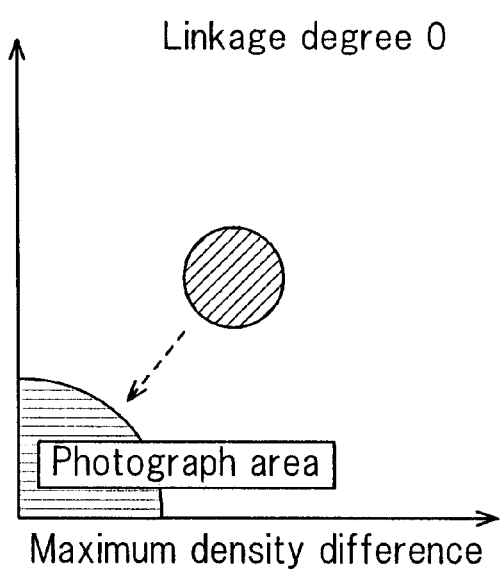

FIG. 19A shows the distribution state in the three-dimensional space of the photographic image having a solid black for the most part. In this distribution state, the photographic image will be judged to be a character area or a dot area. Therefore, a correction is made so as to move in the direction of the origin set in the photograph area so that the image having this feature is judged to be a photograph area. For example, as shown in FIG. 19B, in the two-dimensional plane in which the linkage degree is assumed to be 0, and the two characteristic values of the maximum density difference and the busyness are designated as the axes, a correction is made so that the maximum density difference and the busyness are multiplied by ½, to move in the direction of the origin set in the photograph area.

Figure 20:
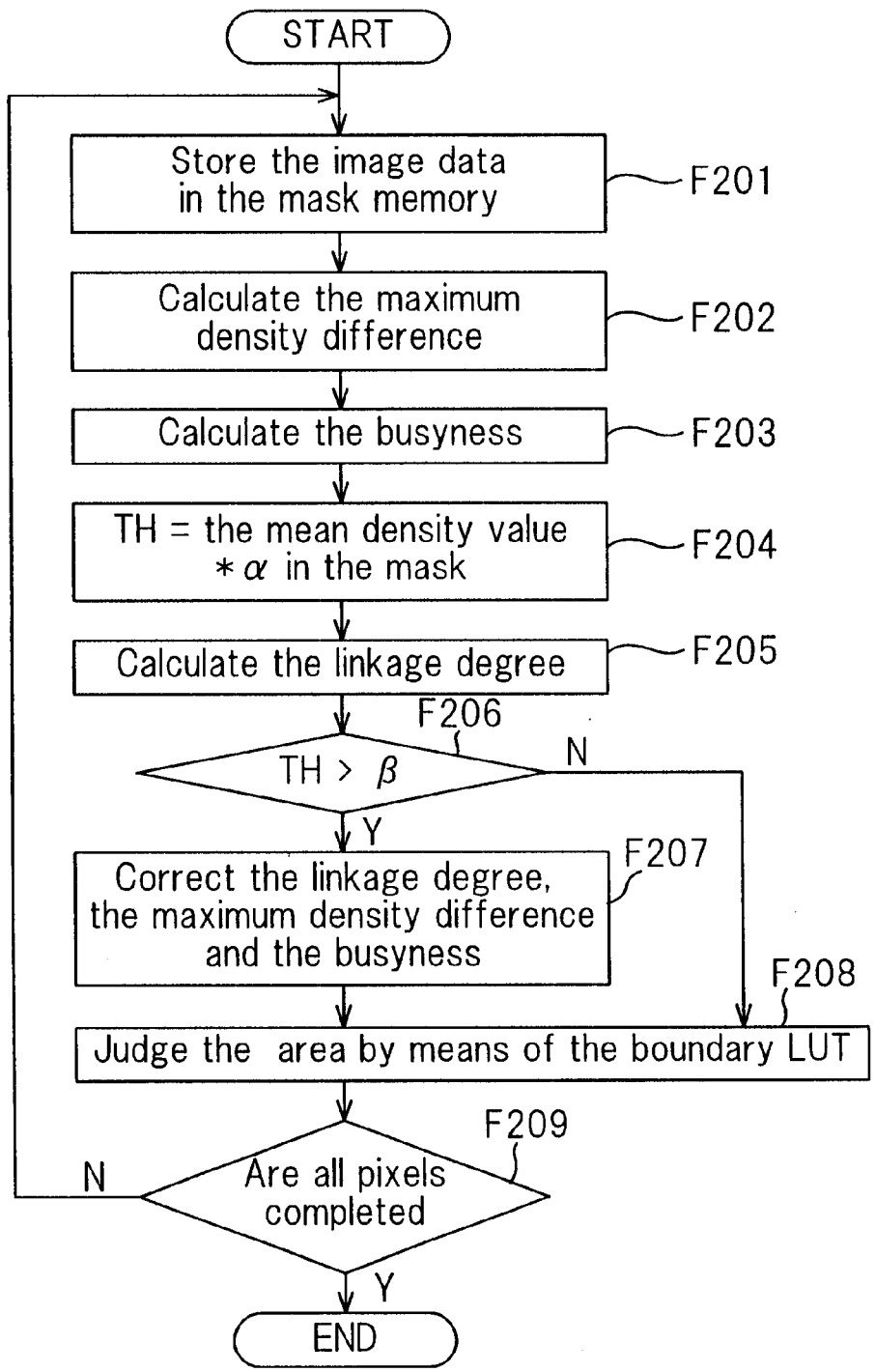
FIG. 20 is a flow chart showing the processing flow of the area judgement control method.

FIG. 20 is a flow chart showing the processing flow of this area judgement control method.

First, the image data (8 bit), the peripheral pixels around the target pixel are stored in the mask memory (F201). The maximum density difference of pixels in the mask is calculated with the maximum density value-detecting circuit 305, the minimum density value-detecting circuit 306 and the subtracter 307 (F202), and the busyness is calculated with the circuit 405 for calculating the sum total of the difference from the adjoining pixels in the main scanning direction, the circuit 406 for calculating the sum total of the difference from the adjoining pixels in the sub scanning direction, and the comparator 407 (F203). Then, the mean value of the density of pixels in the mask is determined in the binarizing circuit 201, multiplied by a predetermined number α, and designated as the threshold TH for the binarization (F204). By comparing the density of the pixels to be processed and TH, the pixels are binarized into binary value. Then, the linkage degree is calculated with the main scanning direction-black pixel counting circuit 202, the sub scanning direction-black pixel counting circuit 203, and the comparator 204. The threshold TH is compared for the binarization with the predetermined value β with the judging circuit 508 (F206). If a pixel exceeds β, the linkage degree, the maximum density difference and the busyness are corrected. For example, the correction processing is performed such that the linkage degree is made 0, and the maximum density difference and the busyness are multiplied by ½ (F207). Using the boundary LUT in which three parameters obtained in the above-mentioned manner are set in advance, it is judged in which area of the character area, the photograph area and the dot area the target pixel belongs (F208). This judgement may be performed by providing the set value finely, not limiting the set value to the above three areas, to divide pixels into multiple areas including the medium area. This process is applied for all the pixels in the image data (F209).

As described above, the correction may be performed according to the mean density value of pixels in the mask or a value based thereon (the threshold for the binarization). Hence, erroneous judgement due to the density (for example, the high density portion of a photographic image) can be prevented.

Another example of the judgement control method will now be described.

This control uses the judgement records of the previous plural pixels with respect to the target pixel, as the predetermined condition for the control, to correct the judgement value or the predetermined boundary. Hence, it becomes possible to provide the feedback from the previous records information to the judgement of the target pixel, hence the erroneous judgement can be avoided.

Figure 21:
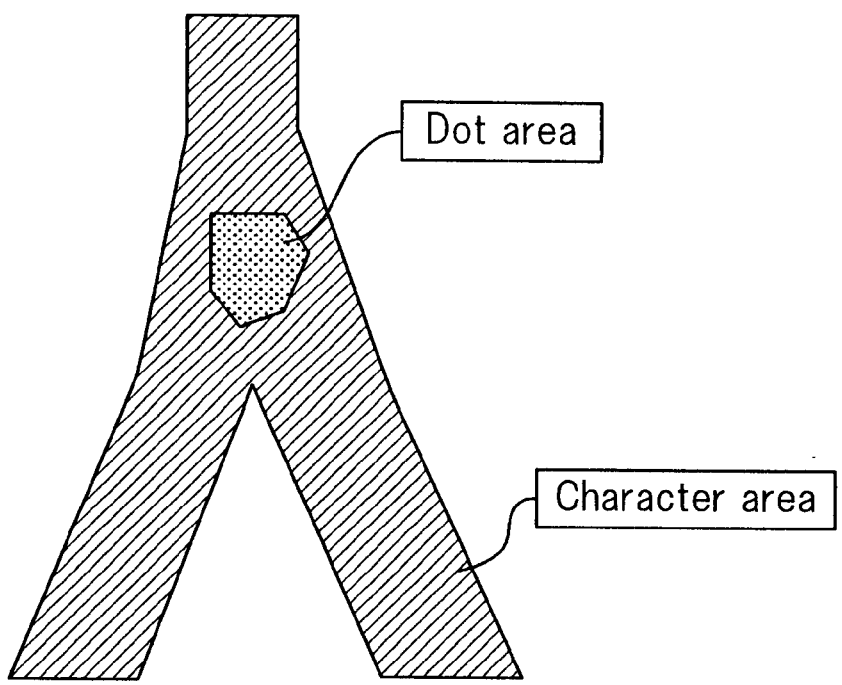
FIG. 21 is a view explaining the image in which a part of the area is lost.

As shown in FIG. 21, there may be caused a loss of area, that is, in the area judgement of the character image, there may be a case that even if the edge portion is judged as a character, the portions other than the edge portion may not be judged as the character area. With this method, such a problem can be avoided. As an example of a processing, there is a method in which the judgement records of previous plural pixels are counted with respect to the target pixel, and according to the count, the LUT which is the set predetermined boundary is changed over. As a specific example, referring to the judgement records of previous ten pixels with respect to the target pixel, if the count in the character area is 5 pixels or more, the LUT is changed over to the boundary LUT in which the character is regarded (the boundary LUT in which many character areas are set).

Figure 22:
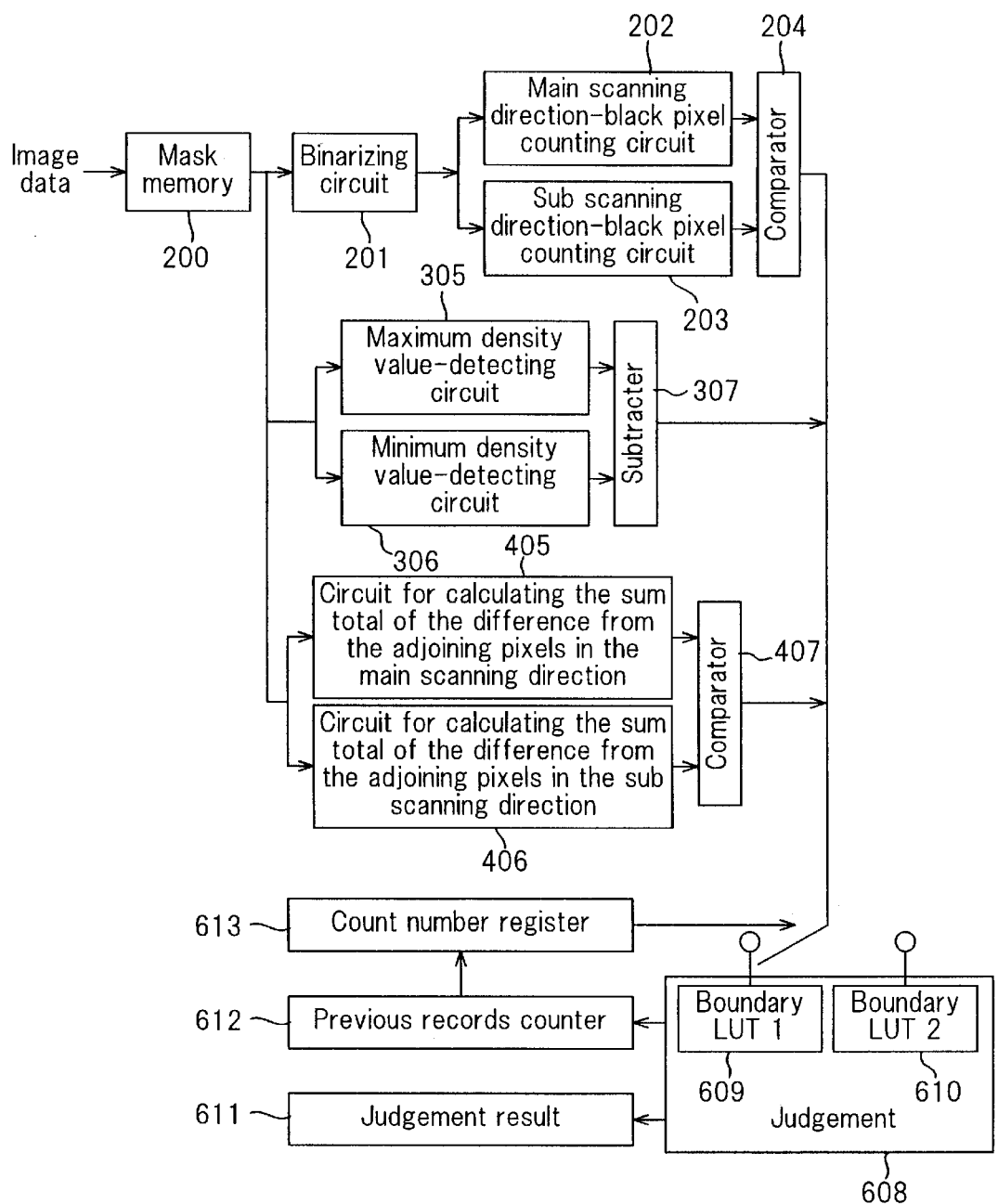
FIG. 22 is a block diagram showing one example of the area judging section which performs the area judgement control.

FIG. 22 is a block diagram of this area judging section. This area judging section comprises a judging circuit 608, a judging result 611, a previous records counter 612, and a counter number register 613, in addition to the mask memory 200, the binarizing circuit 201, the main scanning direction-black pixel counting circuit 202, the sub scanning direction-black pixel counting circuit 203, the comparator 204, the maximum density value-detecting circuit 305, the minimum density value-detecting circuit 306, the subtracter 307, the circuit 405 for calculating the sum total of the difference from the adjoining pixels in the main scanning direction, the circuit 406 for calculating the sum total of the difference from the adjoining pixels in the sub scanning direction, the comparator 407 of the area judging section in the fourth embodiment. The judging circuit 608 includes a first boundary LUT 609 and a second boundary LUT 610, and the first boundary LUT 609 and the second boundary LUT 610 can be changed over.

The calculation of the value of the linkage degree, the maximum density difference and the busyness was explained in the fourth embodiment, therefore the description thereof is omitted. The judging circuit 608 performs the judgement normally with the first boundary LUT 609 to determine the judgement result. This judgement result is counted with the previous records counter 612 such that the number of pixels which is the character area is counted, referring to the previous 10 pixels with respect to the target pixel, and the result thereof is held in the count number register 613. If the count is 5 pixels or more, the target pixel is judged by the second boundary LUT 610 which is the boundary LUT in which characters are regarded.

As described above, since appropriate processing is performed according to the judgement records of the previous plural pixels with respect to the target pixel, it is possible to provide a feedback from the previous record information to the judgement of the target pixel, hence the erroneous judgement can be avoided.

When the linkage degree, two characteristic values of other than the linkage degree, or the linkage degree and the two characteristic values are corrected according to the mean density value of pixels in the mask or the judgement records of the previous plural pixels with respect to the target pixel, erroneous judgement can be also avoided and the judgement accuracy can be improved.

Furthermore, the correction of the predetermined value for the judgement or the predetermined boundary may be performed, or the correction may be performed by combining the linkage degree, two characteristic values other than the linkage degree, predetermined value for the judgement, or the predetermined boundary, respectively.

According to the invention of the gist 1, by the conversion into the binary value, the linkage of pixels can be detected, and since the character area, the photograph area and the dot area have a certain dimension, respectively, by referring to the peripheral pixels, the characteristics of the image can be easily extracted. By the parameter of the linkage degree, respective characteristics (that the character area has a lot of linkage of lines, that the linking with the same length continues in the dot area, and that the photograph area does not have a large change in the density) are extracted. Then, it has such an effect that by comparing them with the predetermined value, separation of areas becomes possible.

According to the invention of the gist 2, since the density parameter is calculated from the density of binarized black pixels in the mask, the linkage degree and the density parameter are designated as the characteristic values, and the area judgement of the target pixel is performed based on the characteristic values, it has such effects that erroneous judgement is reduced, and the judgement accuracy is improved. Furthermore, according to the setting of the judgement boundary due to the characteristic values, more accurate and finer judgement becomes possible.

According to the invention of the gist 3, 4 and 5, since the judgement is performed based on the linkage degree, the maximum density difference and the busyness, the judgement accuracy is improved.

According to the invention of the gist 6 and 7, the mean value of the density of pixels in the mask is varied for each mask, thereby the judgement accuracy of the character portion with a low density which could not be detected with a fixed threshold, and the photograph portion with a high density which should not be extracted as the linking pixels is improved.

According to the invention of the gist 8 and 9, the threshold for binarization is varied so that there is a difference in the linkage degree in each area, based on the mean value of the density of pixels in the mask, thereby a value suitable for extracting the characteristic is set, hence areas where the separation has been difficult with the mean value of the density of pixels in the mask (medium to high density portion of the dot area having lots of lines, and a character portion) can be separated.

According to the invention of the gist 10 and 11, the number of black pixels in each line is counted both in the main scanning direction and in the sub scanning direction from the results of binarization in the mask, and the largest value among them is designated as the linkage degree, thereby the segments can be detected in the vertical direction and in the horizontal direction.

According to the invention of the gist 12 and 13, the number of successive black pixels in each line both in the main scanning direction and in the sub scanning direction is counted from the results of binarization in the mask, and the largest value among them is designated as the linkage degree, thereby only the segment linking in the vertical direction and in the horizontal direction can be detected to improve the accuracy in detecting the segment.

According to the invention of the gist 14 and 15, the number of successive black pixels in each line both in the main scanning direction and in the sub scanning direction is counted from the results of binarization in the mask, the results for successive plural lines are added thereto, and the largest value among them is designated as the linkage degree, thereby the segment linking in the vertical direction and in the horizontal direction can be detected, and the range of results extends to plural times, which makes the judgement easy.

According to the invention of the gist 16 and 17, the number of successive black pixels in each line is counted in the main scanning direction, in the sub scanning direction, and in two diagonal directions at 45° from the results of binarization in the mask, the results for successive plural lines are added thereto, and the largest value among them is designated as the linkage degree, thereby segments linking not only in the vertical direction and in the horizontal direction, but also in the diagonal directions can be detected, to improved the accuracy in separating the diagonal segment portion of the character.

According to the invention of the gist 18, when the number of the successive black pixels in each line is counted in the main scanning direction, in the sub scanning direction, and in two diagonal directions at 45°, normalization is performed according to the difference in the total pixel number to be counted in each direction, hence in the square mask, the difference caused by a fact that the number of pixels in one line is the same in the main scanning direction and in the sub scanning direction, but different in the diagonal direction at 45° can be alleviated approximately.

According to the invention of the gist 19 and 20, the number of successive black pixels in each line is counted both in the main scanning direction and in the sub scanning direction from the results of binarization in the mask, the results for successive plural lines are added thereto, and further (maximum value−minimum value) of the added results in the main scanning direction and in the sub scanning direction, respectively is determined, and the largest value is designated as the linkage degree, thereby the linkage degree in the character area is little affected. Moreover, since the linkage degree in the dot area and the photograph area is decreased, the accuracy of separation is increased.

According to the invention of gist 21 and 22, when the number of pixels in the mask differs in the main scanning direction and in the sub scanning direction, the characteristic value is normalized, hence the difference in the calculation results due to the difference in the number of pixels can be alleviated approximately.

According to the invention of gist 23 and 24, when conforming to the predetermined conditions, the judgement according to the characteristic value can be corrected and controlled, hence the processing of correction or the like can be performed only to a desired pixel or parameter, to further improve the judgement accuracy.

What is claimed is:

1. An area judging apparatus for judging multiple areas including character portions, photograph portions and dot portions, comprising:

binarizing means which designates a block of a predetermined number of pixels centering around target pixels among the image data as a mask, and compares the pixels in said mask with a threshold to binarize it into binary values;

linkage degree-calculating means for calculating the linkage degree indicating the linking conditions of black pixels, based on the number of black pixels for each line in each direction in said binarizing mask;

density parameter-calculating means for calculating the density parameter from the density of the black pixels in said binarizing mask; and area judging means for designating said linkage degree and said density parameter as the characteristic value, and judging an area of said target pixels based on the characteristic value;

wherein said linkage degree-calculating means counts the number of black pixels in each line in the main scanning direction as a first value and in the sub scanning direction as a second value from the results of binarization in said mask, and designates the larger of said first and second values as the linkage degree.

2. An area judging apparatus according to claim 1, wherein said linkage degree-calculation means counts the number of successive black pixels in each line.

3. An area judging apparatus for judging multiple areas including character portions, photograph portions and dot portions, comprising:

binarizing means which designates a block of a predetermined number of pixels centering around target pixels among the image data as a mask, and compares the pixels in said mask with a threshold to binarize it into binary values;

linkage degree-calculating means for calculating the linkage degree indicating the linking conditions of black pixels, based on the number of black pixels for each line in each direction in said binarizing mask;

density parameter-calculating means for calculating the density parameter from the density of the black pixels in said binarizing mask; and area judging means for designating said linkage degree and said density parameter as the characteristic value, and judging an area of said target pixels based on the characteristic value;

wherein said linkage-calculating means counts the number of successive black pixels in each line in both the main scanning direction and in the sub scanning direction as first and second values respectively from the results of the binarization in said mask, adds the first values for successive plural lines in the main scanning direction so as to create a first sum, adds the second values for successive plural lines in the sub scanning direction so as to create a second sum, and designates the larger of the first sum or the second sum as the linkage degree.

4. An area judging apparatus for judging multiple areas including character portions, photograph portions and dot portions, comprising:

binarizing means which designates a block of a predetermined number of pixels centering around target pixels among the image data as a mask, and compares the pixels in said mask with a threshold to binarize it into binary values;

linkage degree-calculating means for calculating the linkage degree indicating the linking condition of black pixels, based on the number of black pixels for each line in each direction in said binarizing mask; and area judging means for designating said linkage degree as a characteristic value, and judging an area of said target pixels based on the characteristic value;

wherein said linkage degree-calculating means counts the number of successive black pixels in each line in the main scanning direction as a first value, in the sub scanning direction as a second value, and in two diagonal directions at 45° as third and fourth values respectively from the results of binarization in said mask, adds the values for said successive plural lines in each of said directions respectively so as to create first, second, third and fourth sums, and designates the largest of said sums as the linkage degree.

5. An area judging apparatus according to claim 4, wherein normalization is performed according to the difference in the total pixel number counted in each direction.

6. An area judging apparatus for judging multiple areas including character portions, photograph portions and dot portions, comprising:

binarizing means which designates a block of a predetermined number of pixels centering around target pixels among the image data as a mask, and compares the pixels in said mask with a threshold to binarize it into binary values;

linkage degree-calculating means for calculating the linkage degree indicating the linking conditions of black pixels, based on the number of black pixels for each line in each direction in said binarizing mask;

density parameter-calculating means for calculating the density parameter from the density of the black pixels in said binarizing mask; and area judging means for designating said linkage degree and said density parameter as the characteristic value, and judging an area of said target pixels based on the characteristic value;

wherein said linkage degree-calculating means counts the number of successive black pixels in each line in the main scanning direction as a first value, in the sub scanning direction as a second value, and in two diagonal directions at 45° as third and fourth values respectively from the results of binarization in said mask, adds the values for said successive plural lines in each of said directions respectively so as to create first, second, third and fourth sums, and designates the largest of said sums as the linkage degree.

7. An area judging apparatus according to claim 6, wherein normalization is performed according to the difference in the total pixel number counted in each direction.

8. An area judging apparatus for judging multiple areas including character portions, photograph portions and dot portions, comprising:

binarizing means which designates a block of a predetermined number of pixels centering around target pixels among the image data as a mask, and compares the pixels in said mask with a threshold to binarize it into binary values;

linkage degree-calculating means for calculating the linkage degree indicating the linking conditions of black pixels, based on the number of black pixels for each line in each direction in said binarizing mask;

density parameter-calculating means for calculating the density parameter from the density of the black pixels in said binarizing mask; and area judging means for designating said linkage degree and said density parameter as the characteristic value, and judging an area of said target pixels based on the characteristic value;

wherein said linkage degree-calculating means counts the number of successive black pixels in each line both in the main scanning direction and the sub scanning direction as first values and second values respectively from the results of binarization in said mask, sequentially adds the first values for successive plural lines in the main scanning direction so as to create at least two first sums, sequentially adds the second values of successive plural lines in the sub scanning direction so as to create at least two second sums, and further determines the difference values (maximum value−minimum value) of the first sums in the main scanning direction and second sums in the sub scanning direction, respectively, and finally designates the largest of said difference values as the linkage degree.

* * * * *